(12) United States Patent
Zhao et al.

(10) Patent No.: US 12,188,521 B2
(45) Date of Patent: Jan. 7, 2025

(54) ROLLING BEARING WITH FULLY-FILLED PLASTIC OIL AND MANUFACTURING METHOD THEREFOR

(71) Applicants: LUOYANG MTP LUBRICATION TECH CO., LTD., Luoyang (CN); SHANGHAI F&S BEARING TECH CO., LTD., Shanghai (CN)

(72) Inventors: Lianchun Zhao, Shanghai (CN); Zhiwu Zheng, Shanghai (CN); Sicheng Zhao, Shanghai (CN); Shuying Chen, Shanghai (CN)

(73) Assignees: LUOYANG MTP LUBRICATION TECH CO., LTD., Luoyang (CN); SHANGHAI F&S BEARING TECH CO., LTD., Shanghai (CN)

( * ) Notice: Subject to any disclaimer, the term of this patent is extended or adjusted under 35 U.S.C. 154(b) by 0 days.

(21) Appl. No.: 17/767,860

(22) PCT Filed: Nov. 26, 2019

(86) PCT No.: PCT/CN2019/120969
§ 371 (c)(1),
(2) Date: Apr. 8, 2022

(87) PCT Pub. No.: WO2021/068375
PCT Pub. Date: Apr. 15, 2021

(65) Prior Publication Data
US 2024/0093733 A1    Mar. 21, 2024

(30) Foreign Application Priority Data

Oct. 10, 2019 (CN) .......................... 201910959962.2
Oct. 10, 2019 (CN) .......................... 201921689504.3
(Continued)

(51) Int. Cl.
*F16C 33/66* (2006.01)

(52) U.S. Cl.
CPC ...... *F16C 33/6696* (2013.01); *F16C 2208/78* (2013.01)

(58) Field of Classification Search
CPC .............. F16C 33/6648; F16C 33/6696; F16C 2208/78
See application file for complete search history.

(56) References Cited

U.S. PATENT DOCUMENTS

| | | | | |
|---|---|---|---|---|
| 4,223,963 | A * | 9/1980 | Glodin | F16C 33/44 29/898.1 |
| 6,228,813 | B1 * | 5/2001 | Yabe | C08L 23/06 508/591 |
| 6,485,184 | B1 * | 11/2002 | Adachi | C10M 169/00 384/907 |

FOREIGN PATENT DOCUMENTS

| | | |
|---|---|---|
| CN | 101316919 A | 12/2008 |
| CN | 102072257 A | 5/2011 |

(Continued)

OTHER PUBLICATIONS

Translation of JP2005-121194 obtained Jan. 19, 2024.*
(Continued)

*Primary Examiner* — James Pilkington
(74) *Attorney, Agent, or Firm* — Zhu Lehnhoff LLP

(57) ABSTRACT

A rolling bearing fully-filled with plastic oil comprises an outer ring, an inner ring, a rolling element between the outer ring raceway and the inner ring raceway, a cage, and a plastic oil to provide lubrication for the bearing. The plastic oil includes a porous lubricating material containing oil. The plastic oil in a fluid state is combined with the rolling element and the cage to present a plastic state and forms an assembly of the rolling element, the cage and the plastic oil after the plastic oil is heated and cured with the bearing. When the bearing is running, the assembly revolves, the rolling element rotates in a window or pocket of the cage, (Continued)

and the lubricating oil contained in micropores of the plastic oil spills out of the micropores to lubricate the bearing.

6 Claims, 5 Drawing Sheets

(30) Foreign Application Priority Data

Oct. 15, 2019 (CN) .......................... 201910979796.2
Oct. 15, 2019 (CN) .......................... 201921726929.7

(56) References Cited

FOREIGN PATENT DOCUMENTS

| | | | | |
|---|---|---|---|---|
| EP | 1225354 A1 | 7/2002 | | |
| JP | 2004019731 A | * | 1/2004 | ............ F16C 23/086 |
| JP | 2005121194 A | 5/2005 | | |
| JP | 2007127282 A | 5/2007 | | |
| JP | 2019157082 A | 9/2019 | | |

OTHER PUBLICATIONS

Translation of JP2004-019731 obtained Jan. 19, 2024.*
International Search Report, issued in PCT/CN2019/120969, dated Jul. 8, 2020.
Written Opinion, issued in PCT/CN2019/120969, dated Jul. 8, 2020.

* cited by examiner

ROLLING BEARING WITH FULLY-FILLED PLASTIC OIL AND MANUFACTURING METHOD THEREFOR

BACKGROUND OF THE INVENTION

Field of the Invention

The invention relates to the technical field of special rolling bearings, in particular, to a rolling bearing with fully-filled plastic oil (or a rolling bearing with fully-filled plastic-state oil) and a manufacturing method therefor.

Description of the Prior Art

Plastic oil is a porous oil-containing lubricating material with a polymer such as polyethylene or ultra-high molecular weight polyethylene (UHMWPE) as a matrix. Compared with grease-lubricated bearings, the bearings lubricated by plastic oil have outstanding characteristics such as anti-pollution, anti-leakage, and long lubrication life, so as to be widely applied in fields such as agricultural machinery, mining machinery, food and beverage, medicine, and textile.

Unlike the lubricating grease that is directly filled into the bearing for use, the plastic oil is a mixture before being added into the bearing, consisting of polymer powder, lubricating oil, and additives and presenting in a viscous fluid state, after being injected into the bearing, then being heated and cured to form the porous oil-containing lubricating material while presenting a plastic state, so that it is called the plastic oil and also known as a solid oil. When the bearing is in operation, due to frictional heat and centrifugal force, the lubricating oil in the micropores of the plastic oil overflows to lubricate the working surface of the bearing; when the bearing stops operation, the lubricating oil is returned to the micropores of the plastic oil.

When the bearing is running, unlike the random flow migration of the grease in the bearing, the position of the plastic oil in the bearing relative to the rolling element and the cage is fixed; therefore, if the plastic oil fluid cannot fully fill the free space inside the bearing when it is injected, there is a permanent shortage of material, which will affect the performance of advantages of anti-pollution, anti-condensation water formation, and long lubrication life for the bearing with plastic oil, and there are discontinuities of the plastic oil in the bearing, the appearance of "skin" of the plastic oil and poor local lubrication in the bearing. Therefore, it is of great practical significance in engineering to find a way to fill the plastic oil viscous fluid fully into the bearing cavity.

SUMMARY OF THE INVENTION

The first objective of the invention is to provide a rolling bearing with fully-filled plastic oil to solve the defects in the prior art that some free spaces inside the rolling bearing with plastic oil are not filled with the plastic oil or are not filled fully with the plastic oil, which affects the performance of the advantages of plastic oil lubrication and even appears other negative effects.

The second objective of the invention is to provide a manufacturing method for the rolling bearing with fully-filled plastic oil to solve the defect that the rolling bearing with plastic oil produced by the prior art may not be fully filled with the plastic oil inside.

The objectives of the invention are realized by the following technical solutions:

A rolling bearing with fully-filled plastic oil includes an outer ring, an inner ring, a rolling element embedded between the outer ring raceway and the inner ring raceway, a cage and a porous oil-containing lubricating material plastic oil to provide lubrication for each contact frictional pair of a bearing, wherein configuring a radial clearance between the cage and the outer ring or/and the inner ring causes fully filling a plastic oil fluid into the bearing cavity unrestrictedly when the plastic oil fluid is injected;

the plastic oil fluid are combined with the rolling element and the cage to present a plastic state and forming an assembly of the rolling element+the cage+the plastic oil after being heated and cured with the bearing; when the bearing is running, the assembly revolves, the rolling element rotates in a window or pocket of the cage, and the lubricating oil contained in micropores of the plastic oil spills out of the micropores to lubricate the contact frictional pair formed by the rolling element–the outer ring raceway, the rolling element–the inner ring raceway and the rolling element–the cage.

Preferably, the rolling bearing with fully-filled plastic oil is a spherical roller bearing with fully-filled plastic oil having a window type pressed steel cage, wherein the configuring a radial clearance between the cage and the inner ring further includes:

causing a unilateral radial clearance between a window bottom of the cage, i.e., an inner edge of a curl of the cage, and the inner ring raceway to be larger than 0.8 millimeters before the plastic oil is injected.

Preferably, the rolling bearing with fully-filled plastic oil is a spherical roller bearing with fully-filled plastic oil having a window type pressed steel cage; the window type pressed steel cage has a cross-sectional shape including an inverted "L" shape, an inclined character " 八 " shape, and an inverted "Z" shape, and correspondingly a window beam of the cage 八 has shapes of a large arc shape, a roof shape and an inclined line shape respectively.

Preferably, the rolling bearing with fully-filled plastic oil is a spherical roller bearing with fully-filled plastic oil having a window type pressed steel cage, and the bearing is configured without a middle guide ring guided by the outer ring or the inner ring.

Preferably, the rolling bearing with fully-filled plastic oil is a cylindrical roller bearing with fully-filled plastic oil having a window type pressed steel cage and a tapered roller bearing with fully-filled plastic oil having a window type pressed steel cage, and the configuring a radial clearance both between the cage and the outer ring and between the cage and the inner ring further includes:

causing the unilateral radial clearances between the cage and the outer ring flange or raceway and between the cage and the inner ring flange or raceway to be both larger than 0.8 millimeters at least at one end surface of the bearing before the plastic oil is injected.

Preferably, the rolling bearing with fully-filled plastic oil is a ball bearing with fully-filled plastic oil having a wave type pressed steel cage, and the configuring a radial clearance both between the cage and the outer ring and between the cage and the inner ring further includes:

causing the unilateral radial clearances between the cage and the outer flange and between the cage and the inner flange to be both larger than 0.8 millimeters before the plastic oil is injected.

Preferably, a width Bc of the curl of the window bottom of the window type pressed steel cage is configured to be reduced to enlarge the radial clearance between the cage and the inner ring; a width Bc of the wave type pressed steel cage is configured to be reduced to enlarge the radial clearance between the cage and the outer ring or/and between the cage and the inner ring.

Preferably, the pressed steel cage is a cage subjected to the nitro-carburizing treatment.

Preferably, the outer ring or the inner ring of the bearing is configuring to be without an oil groove and an oil hole.

Preferably, the plastic oil includes polymer substrates, lubricating oils, fatty acid salts, and solid lubricants, which have weight proportions of 20~40%, 50~80%, 0.1~1.5%, and 0~1% respectively, and are in a viscous fluid state before being cured by heat while being in a state of porous oil-containing plastic after being cured by heat; a diameter of the micropore is 1 micron to 10 microns, and the micropores are communicated with each other in a matrix form.

Preferably, the polymer substrate is polyethylene or ultra-high molecular weight polyethylene; the lubricating oil in the plastic oil is an industrial grade lubricating oil or a food grade lubricating oil; the fatty acid salt is stearate; the solid lubricant is graphite or molybdenum disulfide or polytetrafluoroethylene.

Preferably, the method includes:

pre-heating the rolling bearing, and pre-heating the plastic oil viscous fluid;

injecting the plastic oil fluid into the bearing cavity from top to bottom or from bottom to top or from both sides simultaneously, and injecting the plastic oil fluid randomly from either side due to symmetrical and equal radial dimensions on both sides of the bearing for the spherical roller bearing, the ball bearing and an insert bearing with housing, for the cylindrical roller bearing and the tapered roller bearing, injecting from a side with a larger one of the unilateral radial clearances between the cage and the outer ring flange or raceway and between the cage and the inner ring flange or raceway, wherein since clearances between the cage and the outer ring and between the cage and the inner ring are both guaranteed on the injection side and there is no longer a hard obstacle to the injection of the plastic oil fluid, each free space that communicates with each other inside the bearing may be filled to obtain the rolling bearing with fully-filled plastic oil fluid.

The method may further include:

heating and curing the rolling bearing with fully-filled plastic oil fluid and auxiliary tools preventing leakage of the plastic oil fluid during the injection simultaneously with a curing temperature of 135~190 degrees, and removing the auxiliary tools to produce the rolling bearing with fully-filled plastic oil.

pre-heating the rolling bearing with a temperature of 50~80 degrees, and pre-heating the plastic oil viscous fluid with a temperature of 70~110 degrees.

the plastic oil comprises polymer substrates, lubricating oils, fatty acid salts and solid lubricants, which have weight proportions of 20~40%, 50~80%, 0.1~1.5% and 0~1% respectively, and are in a viscous fluid state before being cured by heat while being in a state of porous oil-containing plastic after being cured by heat; a diameter of the micropore is 1 micron to 10 microns, and the micropores are communicated with each other in a matrix form.

The polymer substrate may be polyethylene or ultra-high molecular weight polyethylene; the lubricating oil in the plastic oil is an industrial grade lubricating oil or a food grade lubricating oil; the fatty acid salt is stearate; the solid lubricant is graphite or molybdenum disulfide or polytetrafluoroethylene.

A rolling bearing with fully-filled plastic oil includes an outer ring, an inner ring, a rolling element embedded between the outer ring raceway and the inner ring raceway, a cage evenly dividing each rolling element in a circumferential direction of the bearing and a porous oil-containing lubricating material plastic oil for providing lubrication for each contact frictional pair of a bearing, the plastic oils inside the bearing being communicated with each other and filling the bearing cavity fully.

The plastic oils inside the bearing being communicated with each other and filling the bearing cavity fully further includes:

the plastic oil completely occupies all the free space that is pre-existing in the bearing and is communicated to each other; the free space is a remaining space after subtracting an occupied space of all bearing part entities contained within an annular space from the annular space formed by wrapping an outer circular surface of the outer ring of the bearing, an inner circular surface of the inner ring of the bearing, a left sealing member of the bearing or a left end surface of the bearing and a right sealing member of the bearing or a right end surface of the bearing. The free space at least includes: a free clearance between the row of cages at the injection side and the outer ring, a free space between the cage and the inner ring, a free clearance between the other row of cages and the inner ring, and all the free space originally existing in the bearing and completely filled by the plastic oil fluid.

BRIEF DESCRIPTION OF THE DRAWINGS

FIG. 4 is a view of the structure of the spherical roller bearing with fully-filled plastic oil according to the invention (with the window beam of the cage in the roof shape), wherein 41 is a bearing outer ring, 42 is a bearing inner ring, 43 is a spherical roller, 44 is a window type pressed steel cage, a cross-sectional shape of the cage presents an inclined character " /\ " shape, 45 is a plastic oil, A1 is a curl of a window bottom of the cage, Bc is a width of the curl, and A2 is a window beam of the cage presenting a roof shape; it can be seen that Bc has decreased, and a unilateral radial clearance $\delta i$ between the cage and the inner ring has increased, reaching more than 0.8 mm; the larger the bearing model, the larger the clearance $\delta i$; the bearing is not provided with a middle guide ring, and there is no oil groove and oil hole on the outer ring; it can be seen from the figure that the plastic oil 45 is fully filled inside the bearing, and the plastic oil at all positions is continuous and communicates with each other.

FIG. 5 is a view of the structure of the spherical roller bearing with fully-filled plastic oil according to the invention (with the window beam of the cage in the line shape), wherein 51 is a bearing outer ring, 52 is a bearing inner ring, 53 is a spherical roller, 54 is a window type pressed steel cage, a cross-sectional shape of the cage presents an inverted "Z" shape, 55 is a plastic oil, A1 is a curl of a window bottom of the cage, Bc is a width of the curl, A2 is a window beam of the cage with a shape close to a straight line, and A3 is a window edge of the cage that turns outward and has a shape close to the straight line; it can be seen that Bc has decreased, and a unilateral radial clearance δi between the cage and the inner ring has increased, reaching more than 0.8 mm; the larger the bearing model, the larger the clearance δi; the bearing is not provided with a middle guide ring, and there is no oil groove and oil hole on the outer ring; it can be seen from the figure that the plastic oil 55 is fully filled inside the bearing, and the plastic oil at all positions is continuous and communicates with each other.

FIG. 6 is a view of the structure of a tapered roller bearing with fully-filled plastic oil according to the invention, wherein 61 is a bearing outer ring, 62 is a bearing inner ring, 63 is a tapered roller, 64 is a window type pressed steel cage, a cross-sectional shape of the cage presents an inverted "L" shape, 65 is a plastic oil, A1 is a curl of a window bottom of the cage, Bc is a width of the curl, and A2 is a window beam of the cage with a shape close to a straight line; δoL and δoR are the unilateral radial clearances respectively on the left and right sides of the bearing between the cage and the outer ring raceway, at least one of which is greater than 0.8 millimeters; δiL and δiR are the unilateral radial clearances respectively on the left and right sides of the bearing between the cage and the inner ring flange, at least one of which is greater than 0.8 millimeters.

DESCRIPTION OF THE PREFERRED EMBODIMENTS

Figure 1A:
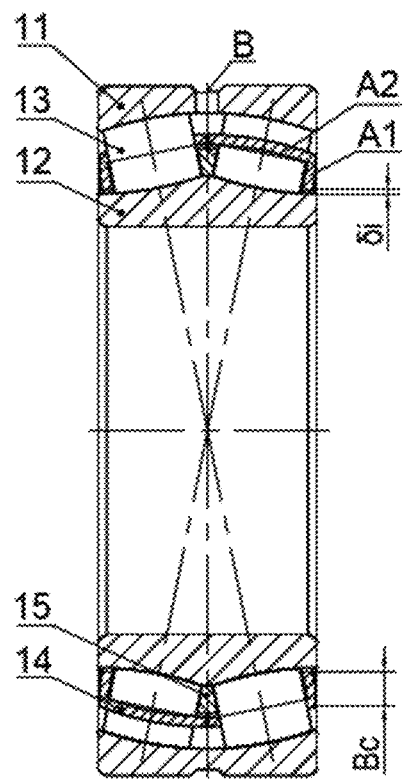
FIG. 1A is a sectional view of an oil-lubricated or a grease-lubricated spherical roller bearing in the prior art.

The applicant found that in order to fully-fill the bearing cavity with the plastic oil fluid, it is not enough to think of a solution from the plastic oil fluid itself and the filling process; according to the requirements of plastic oil lubrication, it is also necessary to make targeted innovations and adjustments to the bearing structures designed and manufactured based on oil lubrication and grease lubrication in the prior art. In the prior art, for the spherical roller bearing, the tapered roller bearing and the cylindrical roller bearing, at the end face of the ring, the cage has a relatively wider curl, and thus forms a unilateral radial clearance of only 0.3~0.8 mm with the inner ring. The purpose of the above situation is mainly to improve the mechanical strength of the cage, but it brings great difficulty to the injection of plastic oil fluid. The smaller the bearing model is, the smaller the clearance and the greater the difficulty of injection is. For the spherical roller bearing, in the prior art, the middle guide ring is further provided, which substantially prevents the flow of plastic oil fluid from the injection side of the bearing to the other side. In the prior art, for the ball bearing with a wave type pressed steel cage such as a deep groove ball bearing, an insert bearing with housing and the like, in order to improve the strength of the cage and the stability of the ball guidance, the width of the cage is getting wider and wider, and the clearance both between the cage and the outer ring flange and between the cage and the inner ring flange is getting smaller and smaller, wherein for small and medium models, this situation is more prominent, which is also very unfavorable for the injection and fully-filling of the plastic oil fluid. Therefore, in order to make the plastic oil fluid fully-filling into the bearing cavity, design and manufacture the rolling bearing with fully-filled plastic oil, it is necessary to innovate and adjust the design and structure of these bearings without affecting the performance of the bearings so as to eliminate unfavorable structures and factors that hindering the plastic oil from injecting and filling the free space inside the bearing; meanwhile, the injection process of plastic oil fluid should be innovated and optimized, so as to design and manufacture the rolling bearing with fully-filled plastic oil, give full play to the greatest advantages of plastic oil lubrication and meet the requirements of more and more personalized and demanding engineering practice.

In other words, the inventors have conducted in-depth research and analysis on the design and manufacturing methods for the existing bearings.

Taking the spherical roller bearing, the cylindrical roller bearing and the tapered roller bearing with a window type pressed steel cage and the ball bearing with the wave type pressed steel cage (such as a deep groove ball bearing, an insert bearing with housing and the like) as an example, in order to improve the strength of the cage and the stability of the ball guidance, the width of the cage (or the width of the curl of the window bottom of the window cage) is getting wider and wider, and the clearances between the cage and the outer ring raceway or raceway flange and/or between the cage and the inner ring raceway or raceway flange are getting smaller and smaller, wherein for small and medium models, this situation is more prominent, which brings a direct challenge to the injection of plastic oil fluid into the bearing cavity.

Figure 1B:
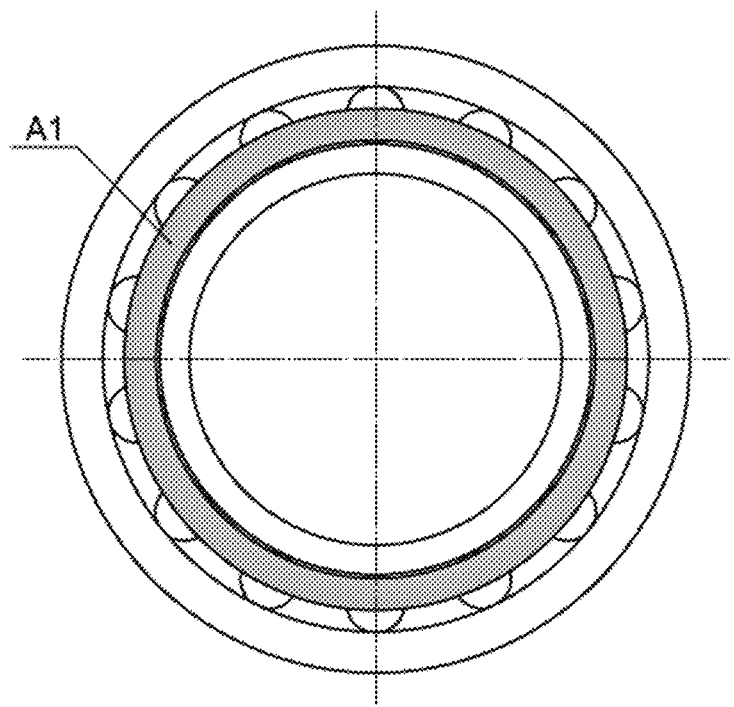
FIG. 1B is a side view of an oil-lubricated or a grease-lubricated spherical roller bearing in the prior art.

FIG. 1A is a sectional view of an oil-lubricated or a grease-lubricated spherical roller bearing in the prior art, wherein 11 is a bearing outer ring, 12 is a bearing inner ring, 13 is a self-aligning roller, 14 is a window type pressed steel cage, a cross-sectional shape of the cage 14 presents an inverted "L" shape, 15 is a middle guide ring, A1 is a curl of a window bottom of the cage, Bc is a width of the curl, and A2 is a window beam of the cage presenting an arc with a large radius; it can be seen that since the width Bc of the curl is relatively large, a unilateral radial clearance δi between the cage 14 and the inner ring 12 is very small; in the figure, B is used to represent the oil groove and the oil hole. FIG. 1B is a side view of an oil-lubricated or a grease-lubricated spherical roller bearing in the prior art, wherein the colored part A1 represents the curl of the window bottom of the cage. From the figure, it can be seen that there is a sufficiently large circumferential clearance between two adjacent spherical rollers 13 and there is a sufficiently large radial clearance between the cage 14 and the outer ring 11, so that when the plastic oil viscous fluid is injected, it may easily pass through the clearance between the cage 14 and the outer ring 11 at the end face of the ring and flows into the free space of the bearing formed between the window beam A2 of the cage 14 and the outer ring 11 along the clearance between the rollers 13 and 13; however, due to the smaller guide clearance between the window hole of the cage 14 and the spherical roller 13 and the smaller axial clearance between the two cages 14 and the existence of the middle guide ring 15 (refer to FIG. 1A), the plastic oil fluid entering the space between the window beam A2 of the cage 14 and the outer ring 11 has no chance to flow into the free space formed between the window beam A2 of the cage 14 and the inner ring 12; further, since the unilateral radial clearance δi between the cage 14 and the inner ring 12 is too small (less than 0.3 mm for the small model and less than 0.8 mm for the large model), when being injected, the plastic oil viscous fluid is difficult to flow into the free space formed between the window beam A2 of the cage 14 and the inner ring 12 through the smaller clearance between the cage 14 and the inner ring 12 at the end surface of the ring, so that there is no plastic oil in the free space between the window beam A2 of the cage 14 and the inner ring 12, resulting in a serious shortage of plastic oil, as shown in FIG. 2.

Figure 2:
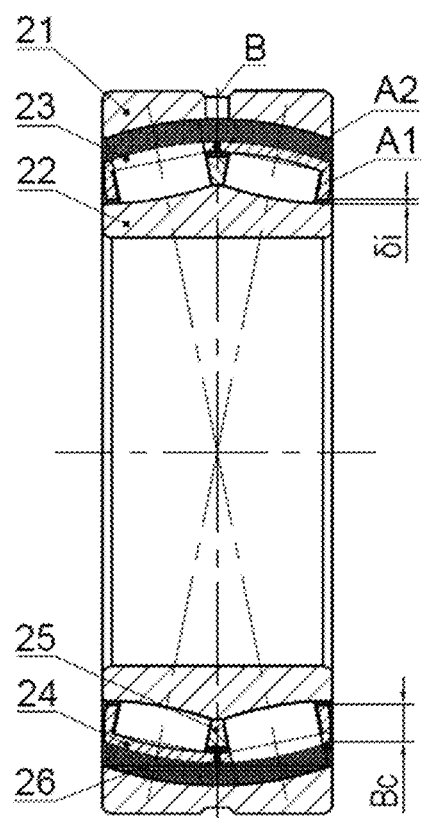
FIG. 2 is a view showing that a plastic oil cannot be filled fully in the spherical roller bearing in the prior art.

FIG. 2 is a view showing that a plastic oil cannot be filled fully in the spherical roller bearing in the prior art, wherein 21 is a bearing outer ring, 22 is a bearing inner ring, 23 is a spherical roller, 24 is a window type pressed steel cage, a cross-sectional shape of the cage presents an inverted "L" shape, 25 is a middle guide ring. 26 is a plastic oil after curing and modeling showing by dense honeycomb hatching, A1 is a curl of a window bottom of the cage, Bc is a width of the curl, and A2 is a window beam of the cage presenting an arc with a large radius. It can be seen that below the window beam A2 of the cage, i.e., between the cage 24 and the inner ring 22, there is no plastic oil, the reason for which is shown in the descriptions of FIGS. 1A and 1B above.

Figure 3:
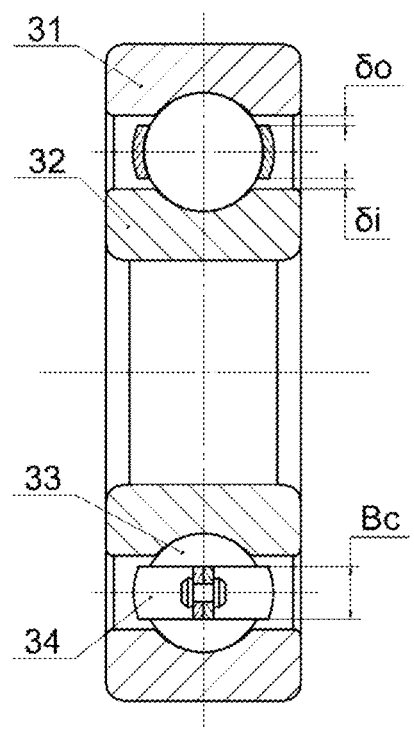
FIG. 3 is a structure view of an oil-lubricated or a grease-lubricated ball bearing in the prior art.

FIG. 3 is a structure view of an oil-lubricated or a grease-lubricated ball bearing in the prior art, wherein 31 is an outer ring, 32 is an inner ring, 33 is a ball, 34 is a wave type pressed steel cage, Bc is a width of the cage, δi is a unilateral radial clearance between the cage and the inner ring, and δo is a unilateral radial clearance between the cage and the outer ring; in the prior art, in the case of a certain ball diameter, in order to improve the strength of the cage and its guiding performance to the balls, the cage width Bc is designed to be wider and wider, so that δi or/and δo become smaller and smaller, thereby causing the problem that the plastic oil may not be fully filled.

To sum up, the design structure of the existing bearing does not meet the requirements of the rolling bearing with plastic oil:

(1) For the existing bearing, in order to improve the strength of the cage and the stability of guiding the rolling element, the width of the cage or the width of the curl of the cage are getting wide, and the radial clearances between the cage and the outer ring raceway or raceway flange and between the cage and the inner ring raceway or raceway flange become smaller and smaller, which is not conducive to the inflow of plastic oil.

(2) For the spherical roller bearing, in order to smooth running of the spherical roller, a middle guide ring is provided; taking the middle guide ring guided by the inner ring as an example (the middle guide ring guided by the outer ring is similar), the middle guide ring guided by the inner ring clings to the inner ring and spans between the two rows of spherical rollers, and even if δi is large enough and the plastic oil may enter and fill the free space between the cage and the inner ring on the injection side, the plastic oil is blocked by the middle guide ring and may not enter and fill the free space between the other row of cages and the inner ring.

(3) For the rolling bearing with plastic oil, the oil groove and the oil hole are superfluous members in design.

For the bearing with solid cage, such as a spherical roller bearing with solid brass cage, a cylindrical roller bearing with solid brass cage, and the like. Since the solid cage itself occupies more space than the pressed steel cage, the injection amount of plastic oil fluid is less; therefore, the solid cage is not preferred for the bearing with plastic oil. Compared with the pressed steel cage, the laminated cloth cage and the plastic cage themselves also have the problem of occupying more space, and the laminated cloth and ordinary plastics such as PA66 are not resistant to high temperature so that the temperature at which the plastic oil cures is a challenge for them. Therefore, for the rolling bearing with the solid cage, the laminated cloth cage and the plastic cage, the solution of lubricating with plastic oil is not preferred.

In the prior art, the spherical roller bearing with window type pressed steel cage has the following technical features: (1) for the bearing with two window pressed steel cages, the cross-sectional shape at a position where the cage contacts and wraps with the working surfaces and the end surfaces of a single spherical roller is the inverted "L" shape, i.e., the window bottom is the curl of the cage presenting the "—" shape, the window beam is the arc shape with a large radius, there is no window edges, and a difference 2δi between a guiding diameter of the cage and the inner ring (i.e., an inner diameter of the window bottom or an inner diameter of the curl of the cage) and a diameter of the theoretical intersection of the inner ring raceway and the end surface is only 0.7 millimeters for smaller model and 1.6 millimeters for larger model, which indicates that the unilateral radial clearance δi between the cage and the inner ring is only 0.35 millimeters for the smaller model and 0.8 millimeters for the larger model at the end surface of the ring, shown specifically in Table 1 below; (2) the middle guide ring (also called a guide lap or a middle separation ring) guided by the inner ring is provided; (3) the outer ring is provided with the oil groove and the oil hole.

TABLE 1

| Unilateral radial clearance between cage and inner ring (unit: mm) | | | | | | | | | | | | | |
|---|---|---|---|---|---|---|---|---|---|---|---|---|---|
| inner exceeds | — | 30 | 50 | 65 | 80 | 100 | 120 | 140 | 160 | 180 | 200 | 225 | 250 |
| diameter d to | 30 | 50 | 65 | 80 | 100 | 120 | 140 | 160 | 180 | 200 | 225 | 250 | 300 |
| 2 δ i | 0.7 | 0.8 | 0.9 | 1.0 | 1.1 | 1.2 | 1.3 | 1.4 | 1.4 | 1.5 | 1.5 | 1.6 | 1.6 |
| δ i | 0.35 | 0.4 | 0.45 | 0.5 | 0.55 | 0.6 | 0.65 | 0.7 | 0.7 | 0.75 | 0.75 | 0.8 | 0.8 |

These technical features are based on the design and manufacture of bearings with oil lubrication or grease lubrication. These technical features are not a problem for grease lubrication, let alone oil lubrication. Taking the grease-lubricated bearing as an example, when the unilateral radial clearance between the cage and the inner ring is only 0.35 millimeters for the smallest model and only 0.8 millimeters for the largest model, it is very difficult to inject grease into the bearing from this clearance when the bearing is injected with grease before leaving the factory. However, there is no reason or necessity to inject grease into the bearing from this clearance, because firstly, the amount of grease injected in the bearing is generally only about 30% of the free space inside the bearing; secondly, the unilateral radial clearance between the cage and the outer ring is large enough, and thirdly, the bearing should be evenly greased before leaving the factory after it is injected with grease and the spherical roller may bring the grease between the cage and the outer ring raceway into the space between the cage and the inner ring raceway when the bearing is evenly greased. This way, when the bearing is in use, the working surfaces of all contact frictional pairs will not suffer from lack of oil and wear at the initial stage of startup. Similarly, the bearing is provided with the guide ring, which also does not have any negative impact on grease injection and bearing usage. Since the amount of grease injected in the bearing is generally only about 30% of the free space inside the bearing and the clearance between the cage and the outer ring and the circumferential clearance between the two adjacent spherical rollers are much larger than the diameter of the oil hole, it is also not necessary to take measures to block the oil hole during grease injection, i.e., the existence of the oil hole does not affect the efficiency in grease injection. As a result, it can be concluded that in the prior art, the technical features of the spherical roller bearing with window type pressed steel cage have no problems or defects when the oil lubrication or the grease lubrication is adopted. On the contrary, the radial clearance between the cage and the inner ring is small, so that the inner ring has a certain guiding function to the cage, which is good to the stable operation of the cage; under the condition that the size of the ring remains unchanged, the smaller radial clearance reflects the larger width of the curl of the window bottom of the cage, which is beneficial to the improvement of the overall strength of the cage; being provided with the middle guide ring is beneficial to the separation and guidance of the two rows of spherical rollers, preventing the skewing and slipping of the rollers, and is beneficial to the smooth and reliable operation of the bearing; the outer ring is provided with the oil groove and the oil hole, which is beneficial to the lubrication supply during the operation and service of the bearing, and is also necessary for the stable and reliable operation of the bearing. As a result, it can be seen that the existing technical features of the spherical roller bearing with window type pressed steel cage are beneficial and necessary when the solution of oil lubrication or grease lubrication is adopted.

Thus, it can be concluded that the existing technical features of the spherical roller bearing with window type pressed steel cage itself are beneficial and harmless when the solution of oil lubrication or grease lubrication is adopted; however, it would be harmful and unhelpful to adopt these technical features for the spherical roller bearing with fully-filled plastic oil with window type pressed steel cage of the invention.

The plastic oil is a porous oil-containing lubricating material, and the bearing with fully-filled plastic oil at least has the following outstanding advantages as compared with the grease-lubricated bearing: (1) anti-pollution, with the reason that the bearing with fully-filled plastic oil leaves no space and gap for foreign contaminants; (2) anti-low speed, ultra-low speed operation and anti-reciprocating swing and even high frequency slight swing, with the reason that the plastic oil wraps the rolling element and has a forced lubrication effect on it and there is no wear phenomenon that occurs in the contact frictional pair formed by the rolling element and the raceway due to the lack of oil replenishment; (3) resisting the formation of condensation and thus avoiding rusting problems caused by condensation, with the reason that the formation of condensate requires two necessary conditions, free space and temperature difference, and now the necessary condition of free space has disappeared; (4) long lubrication life, with the reason that the base oil sealed into the plastic oil-lubricated bearing is several times that of the grease-lubricated bearing. When the plastic oil cannot fully fill the bearing cavity, the above advantages will be reduced; the more free space left, the more serious the reduction will be; there will even be isolated "skins" or "stripes" of plastic oil that are not connected to the main plastic oil due to the injection of too little plastic oil into some free spaces in the bearing, which leads to a risk of seizing the bearing when the bearing is running. Further, when the plastic oil cannot fully fill the bearing cavity, since the plastic oil is combined with the cage and the balls so that it cannot flow and the lack of material cannot be compensated, the contact frictional pair in the material-deficient part cannot be lubricated in time during each startup and initial operation of the bearing, and hence has the risk of abrasion and wear; it can be seen that when the bearing adopts the solution of lubricating with the plastic oil, how important is the full filling of the plastic oil to the bearing.

Taking the spherical roller bearing with window type pressed steel cage as an example, in the prior art, the unilateral radial clearance between the cage and the outer ring is relatively large, and there is absolutely no problem in filling the plastic oil from here, but the unilateral radial clearance $\delta i$ between the cage and the inner ring is smaller (as shown in the above Table 1), which causes difficulties for the plastic oil to be filled from here; the existence of the middle guide ring guided by the inner ring basically blocks the flow of the plastic oil from the injection side to the other side. Therefore, under the condition of a certain design of the ring and the rolling element, in order to solve the problem that the plastic oil cannot be fully filled in the spherical roller bearing with window type pressed steel cage, only the following measures may be considered: (1) A guide diameter of the cage and the inner ring, i.e., an inner diameter of the window bottom of the cage, is increased, but this will reduce the width of the curl of the cage at the window bottom. Will this affect the strength of the cage? (2) the middle guide ring guided by the inner ring is removed, but will this affect the smoothness of the operation of the roller? After analyzing the characteristics of the bearing lubricated with the plastic oil, both of these measures may be taken with no negative effects or with controllable negative effects.

After being heated and cured with the bearing, the plastic oil fluid injected into the bearing are combined with the roller and the cage to present a plastic state and form an assembly of the roller+the cage+the plastic oil; when the bearing is running, the assembly revolves, the roller rotates in the window of the cage, and the lubricating oil contained in micropores of the plastic oil spills out of the micropores to lubricate the contact frictional pair formed by the roller–the outer ring raceway, the roller–the inner ring raceway and the roller–the cage. The formation of the assembly makes the three elements of the roller, the cage and the plastic oil in the assembly "bound" together, which are mutually reinforced and stabilized with each other. Therefore, the above two measures may be taken to solve the problem that the plastic oil can not be fully filled into the spherical roller bearing with a window type pressed steel cage. For lubricating the spherical roller bearing with the plastic oil, it is impossible not to take these two measures, and the adoption of these two measures is beneficial and harmless. When the cross-sectional shape of the cage adopts the inclined character " 八 " shape or the inverted "Z" shape, the structural strength of the cage itself and the assembly of the roller–the cage–the plastic oil may be further improved.

As mentioned above, after the plastic oil is formed, the assembly of the rolling element–the cage–the plastic oil is formed, and the three parts are wrapped together, inseparable, strengthened and stabilized by each other. However, there is also a side effect, i.e., once there is a worn and falling object between the cage and the rolling element due to contact friction, the object cannot be discharged from the assembly; the falling object, as a foreign matter, is parasitic between or near the contact pair of the rolling element–the cage, which will undoubtedly increase the wear of the rolling element and the cage in turn. In the invention, a nitro-carburizing cage is used, so that the anti-wear ability of the cage has been greatly improved, which may effectively inhibit or even avoid the occurrence of this side effect.

For the spherical roller bearing lubricated with grease, considering the lubrication supply during the operation of the bearing, it is normal or even necessary for the outer ring to be provided with the oil groove and the oil hole; however, after the solution of lubricating with the plastic oil is adopted, since the plastic oil fully fills the bearing cavity, the lubrication life of the bearing is doubled, and the lubrication supply is no longer necessary. When the plastic oil fluid is injected, heated, and cured, if the outer ring is provided with the oil groove and the oil hole, the plastic oil fluid will definitely overflow from the oil hole, which will not only cause waste, but also cause the problem that the plastic oil may not fully fill the bearing cavity, so all oil holes must be blocked. After the plastic oil is cured and formed, the parts for blocking are pulled out one by one, which is very time-consuming and has a significant impact on the production efficiency in treating the plastic oil of the bearing. Therefore, in the invention, the outer ring of the spherical roller bearing with fully-filled plastic oil is no longer designed and processed with the oil groove and the oil hole.

Taking the spherical roller bearing with fully-filled plastic oil with window type pressed steel cage as an example, the above issues focus on explaining why the existing technical solution may not be adopted, what are the limitations and defects of the current technical solution, what is the technical solution of the invention, what is the basis for adopting the technical solution of the invention and what good effects will be produced after adoption, wherein principles, ideas and solutions are fully applicable to the cylindrical roller bearing with fully-filled plastic oil with window type pressed steel cage and the tapered roller bearings with fully-filled plastic oil with window type pressed steel cage as well as the ball bearing with fully-filled plastic oil with window type pressed steel cage (including, but not limited to the deep groove ball bearing with fully-filled plastic oil and the insert bearing with housing with fully-filled plastic oil), and will not be repeated here.

Before the plastic oil viscous fluid is injected into the bearing, pre-heating the bearing and the plastic oil fluid at different temperatures is very beneficial to the injection of the plastic oil fluid into the bearing cavity. In addition to temporarily increasing the internal clearance of the bearing, pre-heating the bearing will also eliminate its "cooling" effect on the plastic oil fluid, which is beneficial to the flow and filling of the plastic oil fluid in the bearing cavity. The plastic oil fluid contains up to 70% of the lubricating oil with higher viscosity. The higher the viscosity of the lubricating oil, the greater the flow resistance, the less conducive to the injection into the bearing cavity. Heating the plastic oil fluid may significantly reduce the viscosity of the plastic oil fluid and reduce the flow resistance during injection, which is also very beneficial to the flow and filling of the plastic oil fluid in the bearing cavity. The adoption of these two pre-heating measures is also meaningful for the efficient and qualified manufacture of the bearing with fully-filled plastic oil.

For the spherical roller bearing with window type pressed steel cage, the cross-sectional shape of the existing cage is the inverted "L" shape, consisting of the curl of the cage at the window bottom and the arc-shaped window beam with a larger radius, without the window edge. In the invention, the cross-sectional shape of the cage is designed and manufactured as the inverted character " 八 " shape, the curl of the window bottom is the same as that in the prior art, but the shape of the window beam is a relatively open " 人 " shape or a roof shape, without window edge. In the invention, the cross-sectional shape of the cage is designed and manufactured as the inverted "Z" shape. The curl of the window bottom is the same as that in the prior art, the shape of the window beam is a straight line, with everted window edge. Compared with the cage of the prior art, the cage of the invention is further improved in strength.

The plastic oil is a porous oil-containing lubricating material. Under certain conditions of the operation of the bearing, lubricating the bearing with the plastic oil has unique advantages over lubricating the bearing with grease and lubricating the bearing with oil. However, the plastic oil is different from grease in many aspects, such as lubrication principle, filling process, and material form. Lubricating with the plastic oil is a novel lubrication way. The design and manufacture of the existing rolling bearing are based on lubricating with oil and lubricating with grease. In the design and manufacture of the bearing with plastic oil, can a qualified bearing with plastic oil with excellent performance be designed and manufactured by copying the design and manufacturing methods of existing bearings without any thinking and innovation? The invention has denied the question. In the design of the bearing with plastic oil, it is necessary to consider the principle and characteristics of plastic oil lubrication and the production process of the plastic oil to get innovative design of the bearing; in the injection process of plastic oil, it is also necessary to consider the characteristics of the plastic oil material itself and the structural characteristics of the bearing to adopt innovate injection method different from lubricating with grease. In the invention, around the theme of fully filling the plastic oil into the bearing, the innovations and improvements adopted for the bearing lubricated with plastic oil are necessary and feasible, and will produce very good practical engineering results. However, these innovations and improvements are not necessarily necessary and feasible for oil and grease lubrication, and even have negative engineering effects.

A rolling bearing with fully-filled plastic oil includes an outer ring, an inner ring, a rolling element embedded between the outer ring raceway and the inner ring raceway, a cage and a porous oil-containing lubricating material plastic oil for providing lubrication for each contact frictional pair of a bearing, wherein configuring a radial clearance between the cage and the outer ring or/and the inner ring causes a plastic oil fluid to fully fill a bearing cavity unrestrictedly when the plastic oil fluid is injected;

the plastic oil fluid are combined with the rolling element and the cage to present a plastic state after being heated and cured with the bearing for forming an assembly of the rolling element+the cage+the plastic oil; when the bearing is running, the assembly revolves, the rolling element rotates in a window or pocket of the cage, and the lubricating oil contained in micropores of the plastic oil spills out of the micropores to lubricate the contact frictional pair formed by the rolling element– the outer ring raceway, the rolling element–the inner ring raceway, and the rolling element–the cage.

The biggest innovation points of the invention are listed as follows:
1) Configuring and particularly increasing the radial clearance between the cage and the outer ring and/or between the cage and the inner ring. After the radial clearance is increased, on the same side of the bearing (such as the left side), both the unilateral radial clearances between the cage and the outer ring and between the cage and the inner ring are greater than 0.8 mm (this condition may not be satisfied on the other side, i.e., the right side), and in this case, the plastic oil fluid needs to be injected into the bearing from the left side; or at least, the unilateral radial clearance between the cage and the outer ring is greater than 0.8 mm (the unilateral radial clearance between the cage and the inner ring is less than 0.8 mm at this side) on one side of the bearing, and the unilateral radial clearance between the cage and the inner ring is greater than 0.8 mm (the unilateral radial clearance between the cage and the outer ring is less than 0.8 mm at this side) on the other side of the bearing, for this case, the plastic oil fluid needs to be injected into the bearing simultaneously or successively from the left and right sides.
2) The hard obstacle is not provided to block the free flow of the plastic oil in the bearing cavity, such as the middle guide ring of the spherical roller bearing.
3) The ring of the bearing is not provided with the oil groove and the oil hole.
4) Pre-heating the bearing and the plastic oil fluid with different temperatures is performed before the injection of the plastic oil fluid to reduce the viscosity of the plastic oil.

After the implementation of the above four innovations, it can be ensured that the plastic oil fluid fully fills the bearing cavity and forms the bearing with fully-filling plastic oil after being cured, wherein the lubrication principle for the rolling bearing with the plastic oil is the principle of porous oil-containing lubrication.
5) The assembly of the rolling element+the cage+the plastic oil is formed after curing, the three parts in the assembly are reinforced and guided with each other as well as cannot be separated, and the plastic oil wraps the rolling element and the cage for forced lubrication.
6) In the assembly of the rolling element+the cage+the plastic oil, the failing object between the cage and the rolling element cannot be discharged from the assembly; in order to eliminate or minimize this negative effect of oil and grease lubrication that does not exist, the nitro-carburizing treatment is performed for the pressed steel cage to maximize the wear resistance of the cage and control the generation of the falling object.

For the spherical roller bearing with fully-filled plastic oil with window type pressed steel cage, the cage has a cross-sectional shape of the inverted "L" shape, the inclined character "/\" shape and the inverted "Z" shape, and correspondingly the window beam of the cage has shapes of a large arc shape, a roof shape, and an inclined line shape respectively. After the unilateral radial clearance δi between the cage and the inner ring is increased to more than 0.8 mm and the middle guide ring is not provided, all these three types of cage structures may achieve the full filling of the plastic oil. However, for the cage with the cross-/\ sectional shape of the character "/\" shape and the inverted "Z" shape, since the window beam deviates more from the center line of the spherical roller, the spherical rollers with a larger diameter or a more number may be provided in the bearing, thereby enhancing the bearing capacity of the bearing.

The plastic oil may be implemented by a variety of materials. The invention also finds that the plastic oil adopts the following formula that has more excellent performance.

The plastic oil includes polymer substrates, lubricating oils, fatty acid salts, and solid lubricants, which have weight proportions of 20~40%, 50~80%, 0.1~1.5%, and 0~1% respectively. The plastic oil is in a viscous fluid state before being cured by heat while being in a state of porous oil-containing plastic after being cured by heat; a diameter of the micropore is 1 micron to 10 microns, and the micropores are communicated with each other in a matrix form. The polymer substrate is polyethylene or ultra-high molecular weight polyethylene; the lubricating oil in the plastic oil is an industrial-grade lubricating oil or a food-grade lubricating oil; the fatty acid salt is stearate; the solid lubricant is graphite or molybdenum disulfide or polytetrafluoroethylene.

The following is a specific embodiment of the composition of the plastic oil fluid: the plastic oil fluid is composed of polyethylene, food-grade lubricating oil and stearate, which account for 35%, 64% and 1% by weight respectively, without solid lubricant.

The above-mentioned weight proportions are respectively 20~40%, 50~80%, 0.1~1.5% and 0~1%, and the sum of the content for each composition is 100%; each composition includes the above-mentioned components and additives added according to actual needs.

The following describes some typical embodiments in conjunction with the accompanying drawings.

Embodiment One

1. Design and Manufacture of the Spherical Roller Bearing with Fully-Filled Plastic Oil (with the Roof-Shaped Window Beam of the Cage)

Figure 4:
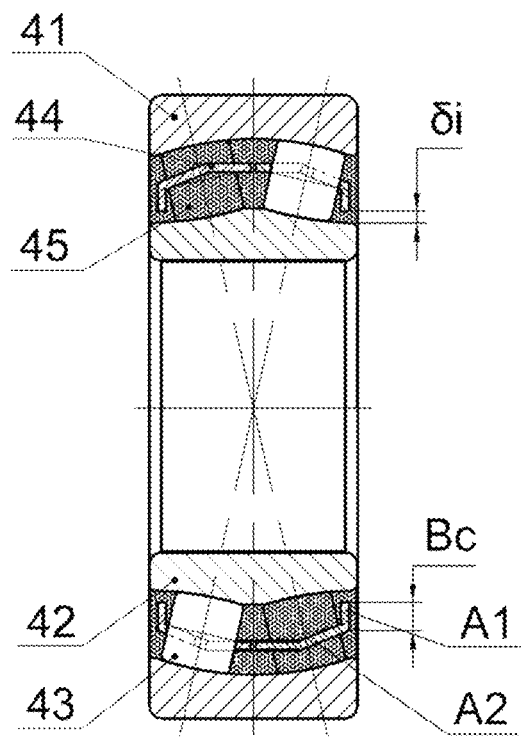
FIG. 4 is a view of a first embodiment of the structure of a spherical roller bearing with fully-filled plastic oil with a window beam of a cage in a roof shape according to the invention.

As shown in FIG. 4, the rolling bearing with fully-filled plastic oil includes an outer ring 41, an inner ring 42, a spherical roller 43 embedded between the outer ring raceway and the inner ring raceway, a cage 44 evenly dividing each spherical roller in a circumferential direction of the bearing and a porous oil-containing lubricating material plastic oil 45 for providing lubrication for each contact area of the bearing.

Compared with the spherical roller bearing with plastic oil in the prior art shown in FIG. 2, the embodiment is still the spherical roller bearing with window pressed steel cage but has the following notable different features: (1) the plastic oil fully fills all the free space that originally exists inside the bearing; (2) the unilateral radial clearance δi between the cage and the inner ring is significantly increased, and at the same time, the width Bc of the curl of the window bottom of the cage is correspondingly reduced; (3) the middle guide ring guided by the outer ring or the inner ring is not provided; (4) the cage has the cross-sectional shape of the inclined character "/\" shape, and the window beam of the cage is in a roof shape; (5) the cage is subjected to the nitro-carburizing treatment; (6) the outer ring is not provided with the oil groove and the oil hole. Among these features, feature (1) is guaranteed by feature (2) and feature (3), feature (2) and feature (3) are means, and feature (1) is objective and result; feature (4) to a certain extent makes up for the decrease in the strength of the single cage due to the implementation of feature (2); feature (3), feature (5) and feature (6) are targeted technical measures taken according to the unique characteristics of lubricating with the plastic oil, and are the preferred technical solutions.

For a roller bearing with plastic oil with a certain model, taking FIG. 2 as an example, the unilateral radial clearance δi between the cage and the inner ring is 0.35 mm, and the width Bc of the curl of the window bottom of the cage is 4.5 mm; in the embodiment, the unilateral radial clearance δi between the cage and the inner ring is increased to 1.8 mm, and the width Bc of the curl of the window bottom of the cage is reduced to 3 mm. The unilateral radial clearance δi between the cage and the inner ring is doubled significantly, so that the fluid may not only flow freely into and fully fill the free space between the cage and the outer ring, but also flow into the free space between the row of cages on the injection side and the inner ring; further, since the bearing is not provided with the middle guide ring guided by the inner ring in the embodiment, the fluid naturally flows into the free space between the other row of cages and the inner ring, and finally the plastic oil fluid completely fills all the free space originally existing in the bearing. In the embodiment, since the window beam is in the roof shape and the window beam deviates a little from the center line of the spherical roller, which not only offsets the adverse effect of the reduction of cage strength caused by the reduction of the width of the curl of the window bottom to a certain extent, but also improves the stability of the guidance to the roller, as well as being conducive to adopt the bearing design with larger diameter roller and more rollers, which is also beneficial to improve the bearing capacity of the bearing.

In the embodiment, the nitro-carburizing cage is used, so that the wear resistance of the cage has been greatly improved, which has a more special significance under the condition that the falling object cannot be discharged from the assembly consisting of the spherical roller–the cage–the plastic oil and the wear may be further aggravated after the solution of lubricating with the plastic oil is adopted.

In the embodiment, the outer ring is not provided with the oil groove and the oil hole. Because the base oil stored in the micropores of the plastic oil is several times that stored in the grease for grease-lubricated bearing and the refilling of the lubricant are no longer necessary when the bearing cavity is fully filled with the plastic oil. If the oil groove and the oil hole are provided, not only increasing extra processes for machining the oil groove and the oil hole on the outer ring, but also more importantly blocking measures must also be taken when the plastic oil fluid is injected into the bearing; further, these blocking measures have to be removed after the plastic oil is heated and cured, which is very time-consuming and labor-intensive.

A manufacturing method for the spherical roller bearing with full-filled plastic oil is as follows:

(1) manufacturing and combining spherical roller bearing with window pressed steel cage, wherein the parts used for the bearing and the combined bearing meet all five technical features of features (2) to (6) mentioned at the beginning of the embodiment;

(2) the polymer, the lubricating oil and the fatty acid salt are sued to make plastic oil mixture in a viscous fluid state;

(3) the bearing is pre-heated with a pre-heating temperature of 60 degrees, (4) the plastic oil viscous fluid is pre-heated with a pre-heating temperature of 100 degrees;

(5) the pre-heated bearing is laid flat, and the pre-heated plastic oil fluid is injected into the bearing cavity from top to bottom or from bottom to top, wherein since both the clearances between the cage and the outer ring and between the cage and the inner ring are guaranteed on the injection side as well as no middle guide ring being provided in the bearing, each free space that communicates with each other inside the bearing may be fully filled, so as to obtain the bearing with fully-filled plastic oil fluid; Since the bearing is not provided with the oil groove and the oil hole, the blocking measures for the oil groove and the oil hole are not taken when the plastic oil fluid is injected, which greatly improves production efficiency;

(6) the rolling bearing with fully-filled plastic oil fluid and auxiliary tools preventing leakage of the plastic oil fluid during the injection are heated and cured simultaneously with a curing temperature of 135~190 degrees, after removing the auxiliary tools, the spherical roller bearing with fully-filled plastic oil is achieved mentioned in the embodiment and shown in FIG. 4.

Embodiment Two

2. Design and Manufacture of the Spherical Roller Bearing with Fully-Filled Plastic Oil (with the Window Beam of the Cage in the Line Shape)

Figure 5:
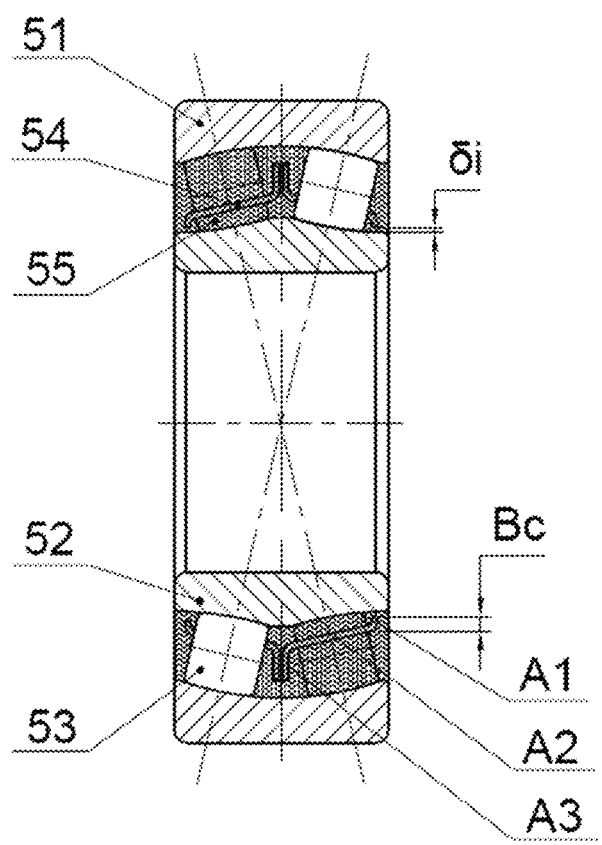
FIG. 5 is a view of a second embodiment of the structure of a spherical roller bearing with fully-filled plastic oil with a window beam of a cage in a line shape according to the invention.

In the embodiment, the spherical roller bearing with fully-filled plastic oil is shown in FIG. 5. The spherical roller bearing with fully-filled plastic oil includes an outer ring 51, an inner ring 52, a spherical roller 53 embedded between the outer ring raceway and the inner ring raceway, a cage 54 evenly dividing each spherical roller in a circumferential direction of the bearing and a porous oil-containing lubricating material plastic oil 55 providing lubrication for each contact pair of a bearing. The unilateral radial clearance between the cage and the inner ring is δi, and the width of the curl of the window bottom of the cage is Bc.

In the embodiment, the bearing is still provided with the window type pressed steel cage, but the cross-sectional shape of the cage is the inverted "Z" shape that different from that in Embodiment one, which includes an A1 portion of the curl of the window bottom, an A2 portion of a straight window beam and an A3 portion of an everting window edge. Compared with the spherical roller bearing in the prior art shown in FIG. 2, due to the provision of the A3 portion of the window edge, the strength of the cage is improved, which offsets the adverse effect of the decrease in strength caused by the reduction of the width Bc of the curl of the window bottom of the cage. In addition, it is obvious that a distance by which the A2 portion of the window beam of the cage deviating from the center line of the spherical roller is larger than that of the spherical roller bearing in the prior art shown in FIG. 2 and the spherical roller bearing with fully-filled plastic oil shown in Embodiment one of the invention, which is very beneficial to use spherical rollers with larger diameter and more numbers, and significantly improving the bearing capacity of the bearing.

Except for the above, the design and manufacture of Embodiment two are the same as or similar to those of Embodiment one, and will not be repeated.

The two embodiments are both described in terms of the spherical roller bearing with fully-filled plastic oil, mainly considering: (1) lubricating with the plastic oil is particularly suitable for many application conditions of the spherical roller bearing; (2) the situation that the plastic oil is not fully filled is the most prominent and typical for the spherical roller bearing; (3) the structure of spherical roller bearing is relatively complicated than that of the cylindrical roller, the tapered roller, and the ball bearing.

Embodiment Three

Figure 6:
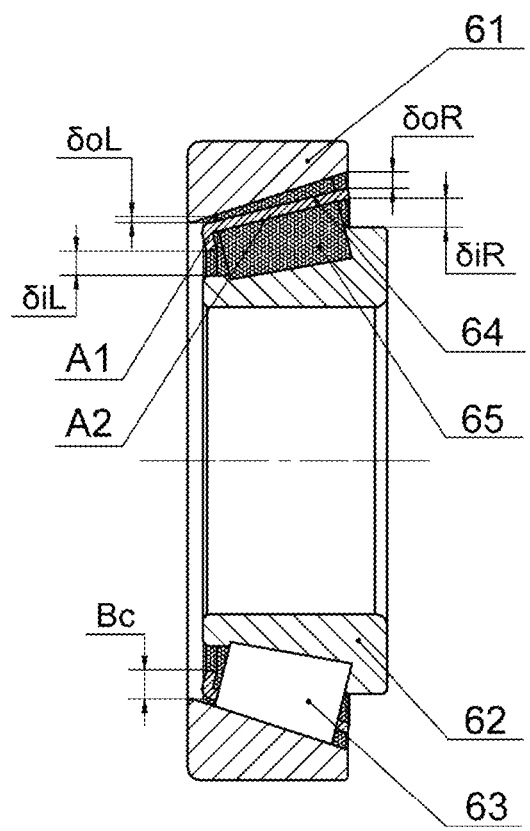
FIG. 6 is a view of a third embodiment of the structure of a tapered roller bearing with fully-filled plastic oil according to the invention.

3. Design and Manufacture of the Tapered Roller Bearing with Fully-Filled Plastic Oil As shown in FIG. 6, the tapered roller bearing with fully-filled plastic oil includes an outer ring 61, an inner ring 62, a tapered roller 63 embedded between the outer ring raceway and the inner ring raceway, a cage 64 evenly dividing each tapered roller in a circumferential direction of the bearing and a porous oil-containing lubricating material plastic oil 65 for providing lubrication for each contact frictional pair of a bearing. The cage is the window type pressed steel cage, subjected to the nitro-carburizing treatment and has a cross-sectional shape of the inverted "L" shape, including an A1 portion of the curl of the window bottom and an A2 portion of a straight window beam. The unilateral radial clearance between the cage and the rings is represented by $\delta$, wherein the subscript i of $\delta$ represents the clearance between the inner ring and the cage, the subscript o represents the clearance between the outer ring and the cage, the subscript L represents the left side of the bearing, and the subscript R represents the right side of the bearing; for example, $\delta_{iL}$ represents the unilateral radial clearance between the cage and the inner ring on the left side of the bearing, and the meanings for $\delta_{oL}$, $\delta_{iR}$, and $\delta_{oR}$ are deduced according to the above definition.

For the design of the tapered roller bearing in the prior art, $\delta_{iL}$, $\delta_{oL}$, $\delta_{iR}$ and $\delta_{oR}$ are all relatively small, and some dimensions of the cage may not be adjusted or the adjustment range is extremely limited due to the structure of tapered roller bearing. The embodiment provides the following four conditions, wherein as long as the cage may be adjusted to meet any one of the following conditions, the plastic oil fluid may be fully filled into the bearing cavity:

(1) $\delta_{iL}$ and $\delta_{oL}$ are greater than 0.8 millimeters at the same time (one of $\delta_{iR}$ and $\delta_{oR}$ is less than 0.8 millimeters), and the plastic oil is injected from the left side of the bearing; or
(2) $\delta_{iR}$ and $\delta_{oR}$ are greater than 0.8 millimeters at the same time (one of $\delta_{iL}$ and $\delta_{oL}$ is less than 0.8 millimeters), and the plastic oil is injected from the right side of the bearing; or
(3) $\delta_{iL}$ and $\delta_{oR}$ are greater than 0.8 millimeters at the same time (both $\delta_{oL}$ and $\delta_{iR}$ are less than 0.8 millimeters), and the plastic oil is injected from the left side and the right side of the bearing; or
(4) $\delta_{oL}$ and $\delta_{iR}$ are greater than 0.8 millimeters at the same time (both $\delta_{iL}$ and $\delta_{oR}$ are less than 0.8 millimeters), and the plastic oil is injected from the left side and the right side of the bearing.

FIG. 6 shows the above-mentioned condition (3), i.e., $\delta_{iL}$ and $\delta_{oR}$ are greater than 0.8 millimeters at the same time (both $\delta_{oL}$ and $\delta_{iR}$ are less than 0.8 millimeters), and the plastic oil fluid needs to be injected from the left and right sides of the bearing at the same time, wherein when injected from the left side, the plastic oil fluid fully fills the free space between the cage and the inner ring; when injected from the right side, the plastic oil fluid fully fills the free space between the cage and the outer ring.

When the plastic oil fluid has to be injected from the left and right sides of the bearing, it may be injected from both sides at the same time, or it may be injected from one side and then injected from the other side.

After the plastic oil fluid is fully filled, the manufacturing and curing methods of the plastic oil fluid are the same as those in Embodiments one and two, and will not be repeated here.

After curing, the tapered roller bearing with fully-filled plastic oil shown in FIG. 6 is manufactured.

The above-mentioned two embodiments of the spherical roller bearing with fully-filled plastic oil and one embodiment of the tapered roller bearing with fully-filled plastic oil are given, and other types of rolling bearings with fully-filled plastic oil are the same or highly similar, which hence should not be described repeatedly.

For the rolling bearing lubricated with the plastic oil, the advantages of lubricating with the plastic oil over lubricating the bearing with grease, such as anti-pollution, anti-condensation water (and thus avoid the rust problem caused by the existence of condensed water), anti-low-speed and anti-ultra-low speed operation, anti-vibration, and long lubrication life, are fully utilized only by making the free space inside the bearing as large as possible and ensuring that the free space is fully occupied by the plastic oil.

In the rolling bearing, more factors should be considered for the design of the rings and the rolling element than for the cage; therefore, the design should not be easily changed. Thus, the design methods implemented above to ensure that the plastic oil fully fills the bearing cavity are all modifications and innovations to the cage. However, the embodiment does not exclude the adjustment of the dimension and structure to the bearing rings and the rolling element if necessary.

Since the plastic oil presents a plastic state and fully fills into the bearing cavity, the rolling element, the cage and the plastic oil are combined into an assembly for revolving together during the running process of the bearing, there is no leakage problem caused by grease and the bearing with plastic oil may be used directly without mounting seals. If the seals are mounted for the bearing with plastic oil, the anti-pollution ability of the bearing will be further improved. For the bearing with seals, a mold or an auxiliary tool is used to reserve and the space for mounting the seals when the plastic oil fluid is injected.

The above-mentioned rolling bearings with fully-filled plastic oil (or bearings) cover all types and structures of rolling bearings, including single-row, double-row and multi-row of ball bearings, cylindrical bearings, needle roller bearings, tapered bearings, spherical roller bearings, etc.

Embodiment Four

The embodiment discloses a manufacturing method for a plastic oil used in a rolling bearing with fully-filled plastic oil.

In the embodiment, the plastic oil includes polymer substrates, lubricating oils, fatty acid salts and solid lubricants, which have weight proportions of 20~40%, 50~80%, 0.1~1.5% and 0~1% respectively, and are in a viscous fluid state before being cured by heat while being in a state of porous oil-containing plastic after being cured by heat; a diameter of the micropore is 1 micron to 10 microns, and the micropores are communicated with each other in a matrix form.

The polymer substrate may be polyethylene or ultra-high molecular weight polyethylene; the lubricating oil in the plastic oil may be an industrial-grade lubricating oil or a food-grade lubricating oil; the fatty acid salt may be stearate; the solid lubricant may be graphite or molybdenum disulfide or polytetrafluoroethylene.

The manufacturing process of the plastic oil in the bearing is given below through a specific embodiment.

(1) a certain amount of the polyethylene powder, the stearate powder, and the food-grade lubricant is selected, which are mixed uniformly with weight proportions of 35%, 64%, and 1% respectively, so as to obtain a plastic oil fluid mixture;
(2) the rolling bearing that meets the technical requirements of the invention is pre-heated to 60 degrees;
(3) the above plastic oil fluid mixture is pre-heated to 100 degrees;
(4) molds and auxiliary tools are used to inject the plastic oil fluid fully into the bearing cavity from one side or two sides of the bearing;
(5) the bearing fully filled with the plastic oil fluid together with the molds or auxiliary tools that preventing the leakage of the plastic oil fluid are placed into an oven for heating and curing, with a curing temperature of 160 degrees;
(6) a porous oil-containing lubricating material plastic oil fully filling the bearing cavity is manufactured.

Embodiment Five

The embodiment provides a rolling bearing with fully-filled plastic oil, which includes an outer ring, an inner ring, a rolling element embedded between the outer ring raceway and the inner ring raceway, a cage evenly dividing each rolling element in a circumferential direction of the bearing and a porous oil-containing lubricating material plastic oil for providing lubrication for each contact frictional pair of a bearing. The rolling bearing that meets the above technical requirements of the invention is selected and equipped with the plastic oil fluid that meets the above technical requirements of the invention, and then the plastic oil fluid is fully filled into the bearing cavity and heated and cured according to the above technical requirements of the invention, thereby obtaining the rolling bearing with fully-filled plastic oil in which the porous oil-containing lubricating material plastic oils are fully filled in the bearing cavity and communicated with each other.

The plastic oils inside the bearing being communicated with each other and fully filling the bearing cavity further includes:

the plastic oil completely occupies all the free space that exists in the bearing and is communicated to each other; the free space is a remaining space after subtracting an occupied space of all bearing part entities contained within an annular space from the annular space formed by wrapping an outer circular surface of the outer ring of the bearing, an inner circular surface of the inner ring of the bearing, a left sealing member of the bearing or a left end surface of the bearing and a right sealing member of the bearing or a right end surface of the bearing. The free space at least includes: a free clearance between the row of cages and the outer ring at the injection side, a free space between the cage and the inner ring, a free clearance between the row of cages and the inner ring at the other side, and all the free space originally existing in the bearing and completely filled by the plastic oil fluid.

It should be noted that compared with the prior art, the embodiment has the following advantages:

For the rolling bearing with fully-filled plastic oil in the embodiment, after being heated and cured with the bearing, the plastic oil fluid that injected into the bearing are combined together with the rolling element and the cage to present a plastic state for forming an assembly of the rolling element+the cage+the plastic oil; when the bearing is running, the assembly revolves, the rolling element rotates in the window or the pocket of the cage, and the lubricating oil contained in micropores of the plastic oil spills out from the micropores to lubricate the contact frictional pairs of the rolling element–the outer ring raceway, the rolling element–the inner ring raceway, and the rolling element–the cage. The formation of the assembly makes the three parts of the rolling element, the cage and the plastic oil in the assembly "bound" together, which are clamped, strengthened, and stabilized with each other. It can be seen that in the embodiment, the plastic oil has the forced lubricating property of "wrapping" the central element, i.e., the rolling element, in the contact frictional pair; after the assembly of the rolling element+the cage+the plastic oil is formed, not only the strength of the cage is strengthened, but also the cage is no longer guided by the flange or raceway of the inner ring or the outer ring as well as no longer guiding the rolling element with components such as the middle guide ring, so that this creates prerequisites for reducing the width of the cage, expanding the clearance between the cage and the inner ring or/and the outer ring, removing the guide ring, and so on.

In the prior art, the bearing was designed based on oil lubrication and grease lubrication. In order to improve the guiding ability of the rings to the cage, the guiding ability of the cage to the rolling element, and the strength of the cage itself, the width of the cage itself becomes larger and larger, and the clearances between the cage and the outer ring and between the cage and the inner ring are designed to be smaller and smaller, especially for the bearing with the pressed steel cage (spherical roller bearing, cylindrical roller bearing, tapered roller bearing, deep groove ball bearing, insert bearing with housing and the like) and the bearing with window type pressed steel cage (spherical roller bearing, cylindrical roller bearing, tapered roller bearing and the like), wherein the spherical roller bearing is provided with the middle guide ring guided by the inner ring or the outer ring. All of these constitute hard obstacles to the entry of the plastic oil fluid into the bearing and the flowing and filling in the bearing cavity, which directly leads to the lack of molded plastic oil, thereby causing poor lubrication in local area of the bearing (especially in the initial stage of each startup and operation of the bearing), condensed water generation in the bearing and further leads to corrosion, and the overall lubrication life of the bearing is shortened and so on. However, on the basis of the above in-depth analysis of the principle and characteristics of lubricating with the plastic oil, the inventor has made innovations and adjustments in the design and structure of these bearings, including but not limited to: configuring the width of the cage to be reduced and configuring the radial clearance between the cage and the outer ring and/or between the cage and the inner ring to be increased so that the plastic oil fluid enters unrestrictedly into the bearing cavity when being injected; removing the parts preventing the plastic oil fluid from flowing and fully filling in the bearing cavity, such as the middle guide ring, causing the plastic oil fluid to fully fill unrestrictedly into the bearing cavity for achieving full filling of the plastic oil fluid in the bearing; obtaining the rolling bearing with fully-filled plastic oil after heating and curing to avoid the damage to the bearing caused by not fully filling of plastic oil on one hand and to maximize all the advantages of the bearing lubricated with plastic oil.

Applying the novel structure of the cage, such as the cage with window type pressed steel cage has a cross-sectional shape of the inclined character " 八 " shape and the inverted "Z" shape, makes up for the adverse factors caused by the reduction of the width of the cage and further improves the strength of the cage. With the metal cage subjected to the nitro-carburizing treatment, minimizing the disadvantage caused by the wear particles of the cage that cannot be discharged from the assembly of the rolling element+the cage+the plastic oil and exacerbate wear.

Similarly, based on the analysis and grasp of lubrication characteristics and filling characteristics of the plastic oil, the outer ring and the inner ring of the bearing are not provided with the oil groove and the oil hole, which not only reduces the machining cost, but also reduces the injection and curing cost of the plastic oil as well as significantly improving the production efficiency of the plastic oil.

When the rolling bearing with fully-filled plastic oil is manufactured, the bearing and the plastic oil fluid are pre-heated differentially before injecting, which is very conducive to the entry and filling of the plastic oil into the bearing cavity, thereby leading to the dual positive significance of improving production efficiency and ensuring full filling of the plastic oil.

The adoption of the above measures enables the embodiment to achieve the following technical effects: the fully-filling of the plastic oil in the bearing cavity is guaranteed, and the efficient production of the bearing with fully-filled plastic oil is guaranteed, thereby avoiding the harm caused by the lack of the plastic oil to the operation of the bearing and maximizing the advantages in technical quality for the bearing lubricated with the plastic oil relative to the bearing lubricated with oil and grease. The above disclosures are only a few specific embodiments of the application, but the application is not limited thereto, and any changes that can be conceived by those skilled in the art should fall within the protection scope of the application.

What is claimed is:

1. A rolling bearing fully-filled with plastic oil comprising an outer ring having an outer ring raceway, an inner ring having an inner ring raceway, a rolling element between the outer ring raceway and the inner ring raceway, a cage, and a plastic oil to provide lubrication for the bearing, the plastic oil including a porous lubricating material containing oil, wherein:
   a radial clearance of greater than 0.8 mm is present between the cage and the outer ring before the plastic oil in a fluid state is injected into the bearing, and a radial clearance of greater than 0.8 mm is present between the cage and the inner ring before the plastic oil in the fluid state is injected into the bearing so that the plastic oil in the fluid state flows into the radial clearances without restriction when the plastic oil in the fluid state is injected into the bearing;
   the plastic oil in the fluid state is combined with the rolling element and the cage to form an assembly comprising the rolling element, the cage, and the plastic oil after the plastic oil is heated and cured within the bearing; and
   when the bearing is running, the assembly revolves, the rolling element rotates in a window or pocket of the cage, and the lubricating oil contained in micropores of the plastic oil spills out of the micropores to lubricate the bearing.

2. A rolling bearing fully-filled with plastic oil comprising an outer ring having an outer ring raceway, an inner ring having an inner ring raceway, a rolling element between the outer ring raceway and the inner ring raceway, a cage, and a plastic oil to provide lubrication for the bearing, the plastic oil including a porous lubricating material containing oil, wherein:
   a radial clearance of greater than 0.8 mm is present between the cage and the outer ring before the plastic oil in a fluid state is injected into the bearing, and a radial clearance of greater than 0.8 mm is present between the cage and the inner ring before the plastic oil in the fluid state is injected into the bearing so that the plastic oil in the fluid state flows into the radial clearances without restriction when the plastic oil in the fluid state is injected into the bearing;
   the plastic oil in the fluid state is combined with the rolling element and the cage to form an assembly comprising the rolling element, the cage, and the plastic oil after the plastic oil is heated and cured within the bearing;
   when the bearing is running, the assembly revolves, the rolling element rotates in a window or pocket of the cage, and the lubricating oil contained in micropores of the plastic oil spills out of the micropores to lubricate the bearing; and
   the plastic oil comprises 20 to 40% by weight of a polymer substrate, 50 to 80% by weight of a lubricating oil, 0.1 to 1.5% by weight of a fatty acid salt, and 0 to 1% by weight of a solid lubricant and is in the fluid state before being cured by heat and is in a plastic state containing the micropores that contain oil after being cured by heat, and the micropores have diameters in a range of 1 to 10 micrometers and are in communication with each other in a matrix form.

3. The rolling bearing according to claim 2, wherein:
   the polymer substrate is polyethylene or ultra-high molecular weight polyethylene;
   the lubricating oil in the plastic oil is an industrial grade lubricating oil or a food grade lubricating oil;
   the fatty acid salt is a stearate; and
   the solid lubricant is graphite or molybdenum disulfide or polytetrafluoroethylene.

4. A manufacturing method for the rolling bearing according to claim 3, comprising:
   pre-heating the rolling bearing, and pre-heating the plastic oil in the fluid state; and
   injecting the plastic oil in the fluid state into a cavity in the bearing from top to bottom, or from bottom to top, or from both sides of the bearing simultaneously, or randomly from either side of the bearing.

5. A manufacturing method for a rolling bearing fully-filled with plastic oil, the bearing comprising an outer ring having an outer ring raceway, an inner ring having an inner ring raceway, a rolling element between the outer ring raceway and the inner ring raceway, a cage, and a plastic oil to provide lubrication for the bearing, wherein the plastic oil includes a porous lubricating material containing oil, a radial clearance of greater than 0.8 mm is present between the cage and the outer ring before the plastic oil in a fluid state is injected into the bearing, and a radial clearance of greater than 0.8 mm is present between the cage and the inner ring before the plastic oil in the fluid state is injected into the bearing so that the plastic oil in the fluid state flows into the radial clearances without restriction when the plastic oil in the fluid state is injected into the bearing, the plastic oil in the fluid state is combined with the rolling element and the cage to form an assembly comprising the rolling element, the cage, and the plastic oil after the plastic oil is heated and cured within the bearing, and when the bearing is running, the assembly revolves, the rolling element rotates in a window or pocket of the cage, and the lubricating oil contained in micropores of the plastic oil spills out of the micropores to lubricate the bearing, the manufacturing method comprising:
pre-heating the rolling bearing, and pre-heating the plastic oil in the fluid state; and
injecting the plastic oil in the fluid state into a cavity in the bearing from top to bottom, or from bottom to top, or from both sides of the bearing simultaneously, or randomly from either side of the bearing.

6. A manufacturing method for a rolling bearing fully-filled with plastic oil, the bearing comprising an outer ring having an outer ring raceway, an inner ring having an inner ring raceway, a rolling element between the outer ring raceway and the inner ring raceway, a cage, and a plastic oil to provide lubrication for the bearing, wherein the plastic oil includes a porous lubricating material containing oil, a radial clearance is present between the cage and the outer ring, and a radial clearance is present between the cage and the inner ring so that the plastic oil in the fluid state flows without restriction into the radial clearances when the plastic oil in the fluid state is injected into the bearing, the plastic oil in the fluid state is combined with the rolling element and the cage to form an assembly comprising the rolling element, the cage, and the plastic oil after the plastic oil is heated and cured within the bearing, and when the bearing is running, the assembly revolves, the rolling element rotates in a window or pocket of the cage, and the lubricating oil contained in micropores of the plastic oil spills out of the micropores to lubricate the bearing, the manufacturing method comprising:
pre-heating the rolling bearing, and pre-heating the plastic oil in the fluid state; and
injecting the plastic oil in the fluid state into a cavity of the bearing from top to bottom, or from bottom to top, or from both sides of the bearing simultaneously, or randomly from either side of the bearing.

* * * * *